No. 817,427. PATENTED APR. 10, 1906.
G. L. HARVEY.
JOURNAL BOX.
APPLICATION FILED MAR. 7, 1904.
2 SHEETS—SHEET 1.
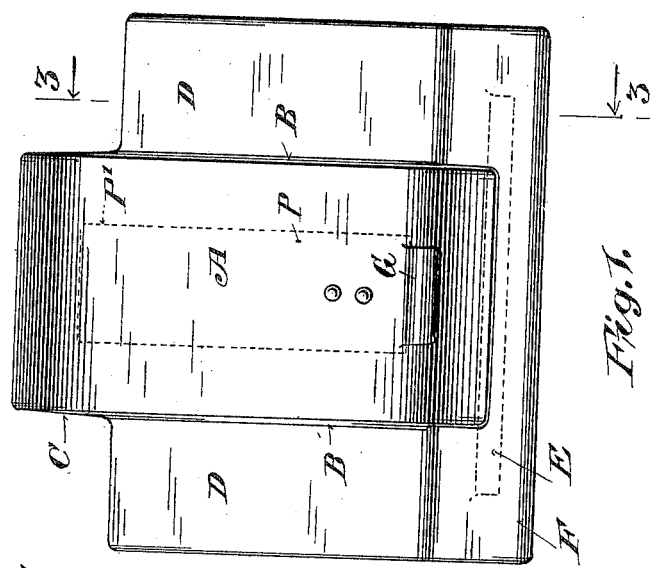
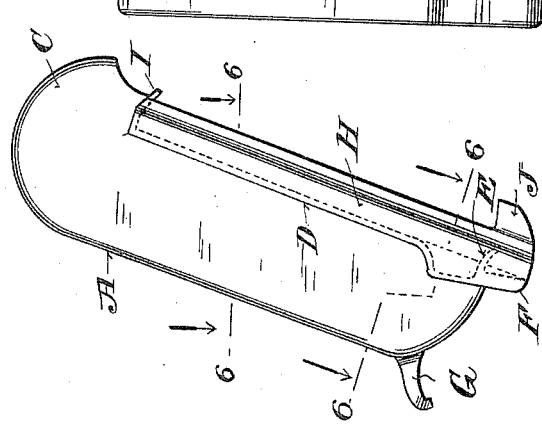
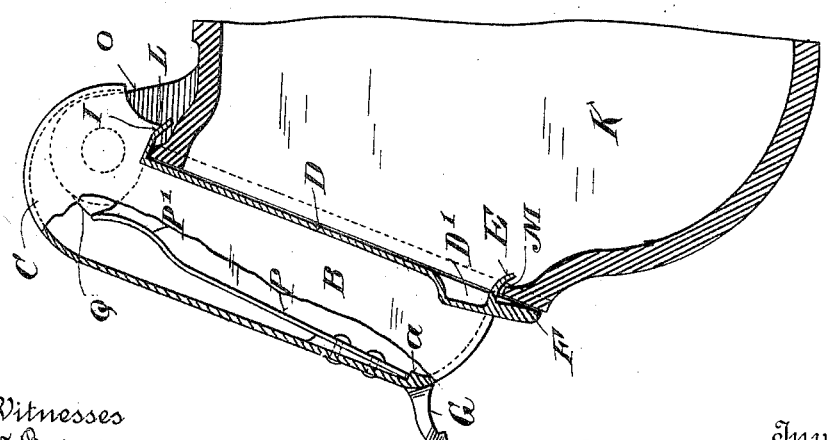
Witnesses
C. W. Benjamin
W. H. Berrigan
Inventor
George Lyon Harvey.
By His Attorneys
Betts Betts Sheffield Betts No. 817,427. PATENTED APR. 10, 1906.
G. L. HARVEY.
JOURNAL BOX.
APPLICATION FILED MAR. 7, 1904.
2 SHEETS—SHEET 2.
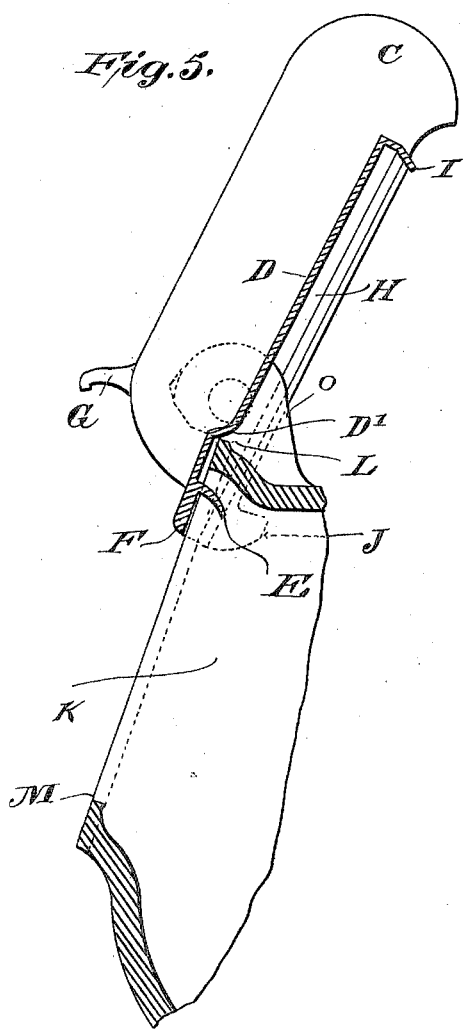
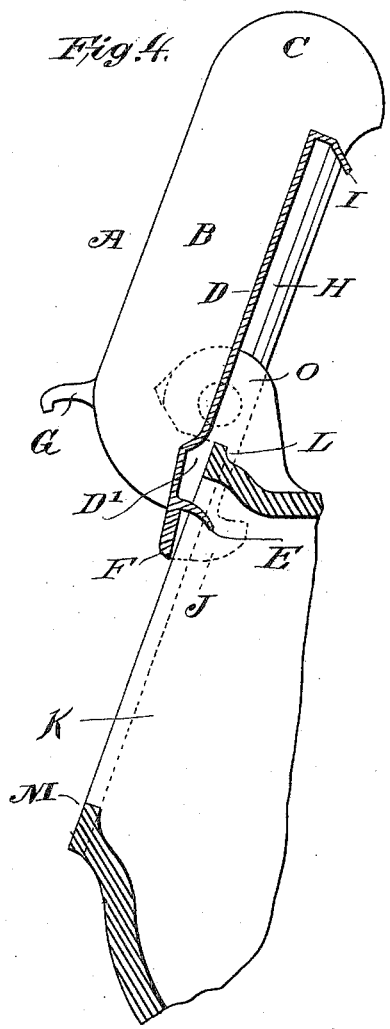
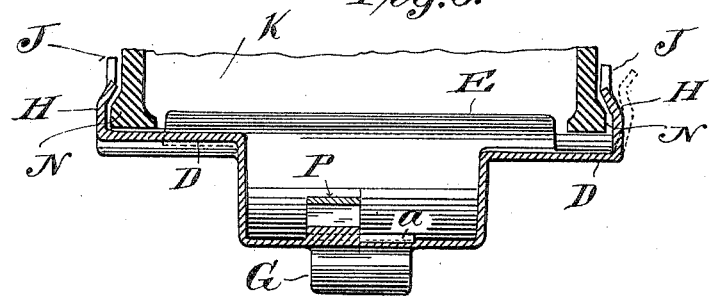

UNITED STATES PATENT OFFICE.

GEORGE LYON HARVEY, OF CHICAGO, ILLINOIS, ASSIGNOR TO CAR BUILDERS SUPPLY COMPANY, OF CHICAGO, ILLINOIS, A CORPORATION OF NEW JERSEY.

JOURNAL-BOX.

No. 817,427.     Specification of Letters Patent.     Patented April 10, 1906.

Application filed March 7, 1904. Serial No. 196,809.

*To all whom it may concern:*

Be it known that I, GEORGE LYON HARVEY, a citizen of the United States, residing at Chicago, in the county of Cook and State of Illinois, (whose post-office address is 175 Dearborn street, Chicago aforesaid,) have invented certain new and useful Improvements in Journal-Boxes, of which the following is a full and true description, reference being had to the accompanying drawings, showing one embodiment of my invention.

The object of this invention is to provide a lid for journal-boxes especially useful in connection with car-axles, which lid is simple in construction, easily attached or removed, and thoroughly dust-proof.

Referring to the accompanying drawings, Figure 1 is a front view of my new form of lid. Fig. 2 is a side view thereof. Fig. 3 is a sectional view showing the lid closed and lid and box cut away on line 3 3, Fig. 1. Fig. 4 is a similar view showing the lid opened. Fig. 5 is a view similar to Fig. 4, showing the lid tilted back to prevent accidental closing; and Fig. 6 is a horizontal sectional view on the lines 6–6 and 6–6 of Fig. 2.

The lid shown in the drawings is adapted to be slid upwardly upon the end of the journal-box carried by the car-truck. To permit the lid to be readily slid, the journal-box is provided with edge ribs and the lid is provided with edge flanges fitting the said ribs. The lid is also provided with a spring, which firmly holds it in closed position, and with a stop employed to tilt the lid rearwardly when lifted and prevent the accidental closing thereof.

Referring to the drawings, it will be seen that the lid is provided with a vertical rib or enlargement A, box-like in shape and having side walls B B and an overhanging dome-shaped top C.

D D indicate laterally-extending front plates, and H H indicate hook-shape flanges extending rearwardly from said plates.

I I indicate downwardly-projecting rearward flanges from the top edges of the lid and extending from the junction of the walls B and plates D to the outer edges of the lid.

F indicates a plate secured to and depending from the parts A and D.

E indicates a rearwardly-projecting and downwardly-extending tilting plate. As shown in Fig. 6, it may be slightly shorter than the space between the opposite side walls of the journal-box, and, as shown in Figs. 4 and 5, it may be coincident with the lower line of the enlargement A. It is obvious that the part E will coöperate with the rib M and form a dust-seal for the lower side of the journal-box. The lid is also provided with recesses D', running crosswise of the lid and slightly above the plate E.

To afford means for moving the lid, it is provided with a forwardly-projecting handle G, and in order to loosely hold the lid from accidental removal when raised, as well as to afford guides to assist in assembling the lid and box, rearward hooks J J at the lower edges of the flanges H are provided.

While the lid may consist of any desired number of pieces, I prefer, as shown, that all parts shall be integral. As hereinafter pointed out, malleable iron may be used.

The lid is intended to slide quite freely upon the end of the journal-box, and in order to hold it tightly to such box, whereby dust is excluded and the lid is prevented from working loose, the lid is provided with a spring. Preferably I employ a single strip P for this purpose, securing the lower end of such strip inside of the enlargement A by means of rivets which pass through the lid. The lower edge of the strip rests upon a shoulder *a*, as shown in Fig. 3, while its upper end P' is curved.

The journal-box K may be of any suitable shape, though I prefer the Master Car-Builders' standard journal-box, for which the illustrated form of my new lid has been especially designed.

As clearly shown in Figs. 3 and 4, the edges of the opening of the journal-box incline rearwardly and the lid is fitted thereon to also slide at an angle forward and rearwardly. In order to hold the lid to the box and to guide it, the box is provided with external side ribs N N, and it is also provided with an outside top rib L and an inside bottom rib M. When fitted upon the journal-box, the side flanges H H of the lid engage with the side ribs N N. In its closed position (see Fig. 3) the overhanging flanges I I of the lid engage the top rib L of the box and the tripping-plate E of the lid engages the bottom rib M of the journal-box, while the depending lip F of the lid rests against the bottom edge of the box. In such position the dome-shaped top C of the lid fits over the hinge-block O, usually provided upon the top of the journal-box, in order that a hinged lid may be attached, if desired, and the upper end P' of the spring presses against the inclined surface Q of the hinge-block, holding the several flanges I I, H H, and F firmly in position, so as to exclude dust entirely around the edges of the box.

When the lid is to be slid upwardly, the handle G is engaged by the hand or by a hook and the lid is pulled or pushed upwardly to about the position shown in Fig. 4, whereupon the tilting plate E strikes against the inside edge of the upper wall of the journal-box. This causes the entire lid to rock rearwardly, as shown in Fig. 5, and the recesses D' fit over the upper rib L of the box. The engagement of such rib and the recesses prevents the lid from sliding back to closed position until it is tilted forwardly, whereupon the lid will close by gravity. In the position shown in Fig. 4 the hooks J J support the lid by engaging with stops formed upon the sides of the box.

Especial attention is called to the form and arrangement of spring P illustrated in the drawings. While being raised the lid will be retarded for about one and one-half inches and will then rise freely, and in closing, when the lid has been tipped forward so as to disengage the rib L from the recesses D', the lid is permitted to drop freely by its own weight for a considerable distance and compresses the spring, so that a slight push is only necessary to completely close it.

In order to fit the lid upon the box, one or both of the hooks J will be bent outwardly, as shown by dotted lines at one side of Fig. 6, so as to permit the hooks to easily pass ribs N, and the hook or hooks are then bent back to their original position. To remove the lid, a cold-chisel or other implement may be used to bend the hook as before.

My new form of lid has dust-proof locks along the four edges, it is securely held in closed position, it employs but one spring for this purpose, and is securely held in open position, so as not to fall and injure the workman's hands, without the necessity for springs, latches, or special parts.

While I have shown and described one form of lid which embodies my invention, I do not desire to be understood as limiting myself thereto, as obvious modifications within the scope of my claims may readily be made by persons skilled in car building or repairing.

What I claim is—

1. In a journal-box, a lid adapted to open only by sliding upwardly, provided with top and bottom dust-excluding flanges, the top flange being adapted to engage the top of the journal-box and the bottom flange being adapted to engage the top of the lower side of the journal-box, and a recess D' located immediately above said bottom flange and adapted to coöperate with the top of the journal-box and allow the lid to tilt backward when the lid is raised, substantially as described.

2. In a journal-box a lid, provided with rearwardly-extending dust-excluding flanges on four sides, all of the flanges projecting rearwardly beyond the outer face of the journal-box to which said lid is fitted, the lid being so arranged that it can be raised only by sliding, the bottom flange being arranged to serve as a tilting device when the lid is raised, substantially as described.

3. In a journal-box, a lid adapted to open by sliding, provided with a rearwardly-extending flange I, adapted to engage the top of the journal-box, and a rearwardly-extending dust-excluding flange E, adapted to engage the upper side of the bottom wall of the journal-box, and a recess D' located adjacent said flange E, substantially as described.

4. In a journal-box, a lid adapted to open only by sliding, having rearwardly-extending dust-excluding flanges on four sides, the flange on the lower side being adapted to serve as a tilting device when the lid is raised, substantially as described.

5. In a journal-box, a lid adapted to open only by sliding, having rearwardly-extending dust-excluding flanges on four sides, a recess D' located above the lower flange, said lower flange being adapted to act as a tilting device when the lid is raised and to cause said recess to coöperate with the upper wall of said journal-box, substantially as described.

In witness whereof I have hereunto signed my name this 27th day of February, 1904.

GEORGE LYON HARVEY.

In presence of—
GEORGE WILLIAM EDEN FIELD,
MARIE KIRLIN HINCHER.